United States Patent

Daley et al.

Patent Number: 5,119,232
Date of Patent: Jun. 2, 1992

[54] INFRARED-TRANSMISSIVE OPTICAL WINDOW

[75] Inventors: Thomas W. Daley, Inglewood; Vale T. Uyreshiro, Rolling Hills Estate, both of Calif.

[73] Assignee: Hughes Aircraft Company, Los Angeles, Calif.

[21] Appl. No.: 628,051

[22] Filed: Dec. 17, 1990

[51] Int. Cl.⁵ .............................. G02B 5/28; G02B 1/10
[52] U.S. Cl. .................................. 359/359; 250/488.1; 359/589
[58] Field of Search .................. 350/1.6, 1.7, 163, 164, 350/166; 250/488.1

[56] References Cited

U.S. PATENT DOCUMENTS

| | | | |
|---|---|---|---|
| 4,778,731 | 10/1988 | Kraatz et al. | 350/1.6 |
| 4,915,476 | 4/1990 | Hall et al. | 350/163 |
| 5,000,527 | 3/1991 | Freeland | 350/1.6 |
| 5,007,689 | 4/1991 | Kelly et al. | 350/1.6 |

Primary Examiner—Bruce Y. Arnold
Assistant Examiner—Martin Lerner
Attorney, Agent, or Firm—M. E. Lachman; W. J. Streeter; W. K. Denson-Low

[57] ABSTRACT

An optical window that transmits infrared radiation and minimizes the effect of microwave radiation comprises:
(a) a layer of a first material that transmits infrared radiation and absorbs microwave radiation, and has a predetermined thickness; and
(b) a layer of a second material that transmits infrared radiation and has a low reflectivity for microwave radiation, having a thickness equal to one-quarter of the wavelength of the microwave radiation, and being located adjacent to the layer of the first material.

10 Claims, 1 Drawing Sheet

INFRARED-TRANSMISSIVE OPTICAL WINDOW

BACKGROUND OF THE INVENTION

1. Field of the Invention

The present invention relates generally to an optical window which transmits infrared radiation. More particularly, the present invention relates to an infrared-transmissive optical window in which the effect of microwave radiation is minimized.

2. Description of Related Art

In various optical systems, it is frequently desired that the optical window be able to selectively transmit or reflect particular types of radiation, such as infrared, visible, or microwave, depending on the particular purpose of the system. For example, if the window provides optical access to a sensor which detects infrared radiation, the window must have a high transmission for infrared radiation. At the same time, the window must be able to prevent the transmission of radiation which would have a negative effect on the sensor behind the window. Various types of optical filters are known in the art for accomplishing this purpose, and include absorption filters, reflective multiple layer dielectric filters, and diffraction filters generated by optical holographic techniques, each of which is discussed below.

The absorption filter comprises a material which is impregnated with absorption dyes or materials having intrinsic absorption at the wavelength of the radiation which it is desired to absorb. However, the dye itself also decreases the amount of the desired radiation which is transmitted.

The reflective multiple layer dielectric filters typically consist of alternate layers of two dielectric materials having different refractive indices, which are deposited on the surface of a substrate. When the optical thickness of each layer is chosen to be one-quarter of the wavelength of the radiation being reflected, the structure is referred to as a "quarterwave stack". However, the numerous abrupt interfaces between successive layers in such a stacked structure may have defects which cause unwanted optical scattering, excessive absorption of radiation which leads to thermal damage, localized electric fields, and a tendency to delaminate.

Diffraction optical elements may be formed by optical holography in photosensitive gelatin materials. However, these structures have environmental stability problems and are susceptible to degradation by humidity and heat. Moreover, gelatin filters are limited to use for radiation in the visible to the near infrared range since sensitized gelatin is not sensitive to longer wavelength exposure. Consequently, gelatin filters cannot be used for infrared applications.

One method for overcoming the previously noted difficulties in the prior art is described in U.S. Pat. No. 4,545,646 to Chern et al, assigned to the present assignee. Chern et al provided a graded index optical material comprising a single layer of a selected material in which the composition and therefore the refractive index of the material is varied in a periodic and continuous pattern as a function of the thickness of the layer. A preferred method for forming single-notch rugate filters of the type described by Chern et al is described in U.S. Pat. No. 4,915,476 to Hall et al, assigned to the present assignee. Hall et al provided an error-compensated method for insuring that the continuously varying refractive index profile of the material as deposited matches the desired or ideal profile. The structures of Chern et al and Hall et al are typically used to protect sensors from damage by laser radiation. While the structures of Chern et al and Hall et al work well for their intended purpose, they were not intended to meet the current need for optical filters which minimize the effects of microwave radiation.

Consequently, there is a current need in the field of optics for a structure which will selectively transmit radiation at desired wavelengths while minimizing the effects of microwave radiation.

SUMMARY OF THE INVENTION

The general purpose of this invention is to provide an optical window which transmits infrared radiation while at the same time minimizing the effects of microwave radiation. This optical window possesses all of the advantages of the prior art filters discussed above while overcoming their above-noted disadvantages.

The above general purpose of the present invention is accomplished by providing a structure comprising:

(a) a layer of a first material which transmits infrared radiation and absorbs microwave radiation, and which has a predetermined thickness; and (b) a layer of a second material which transmits infrared radiation and has a low reflectivity for microwave radiation, and which has a thickness which is equal to one-quarter of the wavelength of the microwave radiation in the second material.

Alternatively, a thin layer of a third material may be provided at the interface of the layer of the first material and the layer of the second material to minimize the reflection of infrared radiation at the interface of these two layers.

The above-discussed and many other features and attendant advantages of the present invention will become better understood by reference to the following detailed description when considered in conjunction with the accompanying drawings.

DESCRIPTION OF THE PREFERRED EMBODIMENTS

Figure 1:
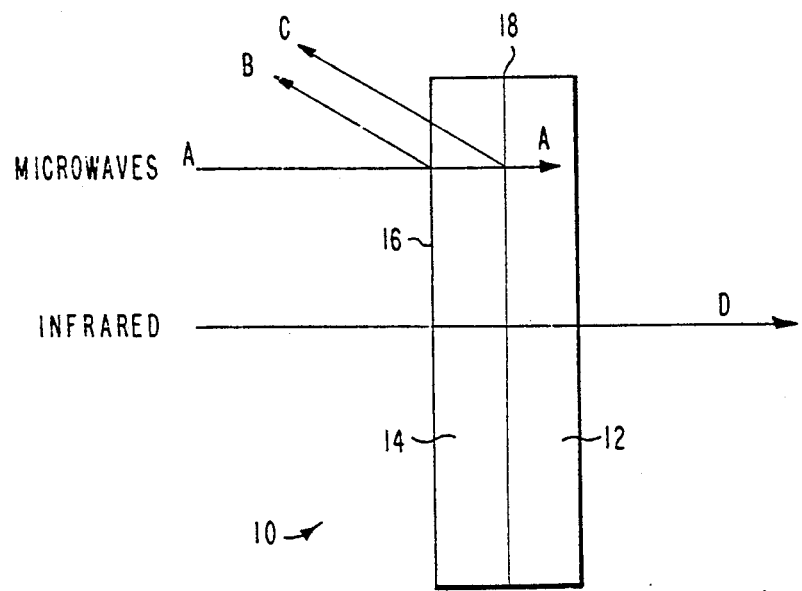
FIG. 1 is a schematic representation of an optical window in accordance with the present invention.

FIG. 1 is a schematic representation of the optical window in accordance with the present invention. The optical window 10 comprises a layer 12 of a material which transmits infrared radiation and which absorbs the microwave radiation which it is desired to ineffectuate. A preferred material for layer 12 is germanium, but other materials, such as silicon or gallium arsenide, may also be used. The thickness of the layer 12 is chosen so that complete microwave attenuation is achieved, and is typically about 0.1 to 2.0 inch (0.3 to 5.1 cm). The preferred thickness for a germanium layer is about 0.1 to 1.0 inch (0.3 to 2.5 cm). The other dimensions, such as diameter, of the layer 12 are chosen to be compatible with the optical system in which the present optical window is incorporated. The layer 12 is typically provided in the form of a free-standing body of material. Adjacent to the layer 12 and in direct or indirect contact therewith, there is provided a layer 14 of a material which transmits infrared radiation and which has a low reflectivity for the microwave radiation of concern. A preferred material for layer 14 is zinc sulfide, but other materials, such as zinc selenide or calcium fluoride, may also be used. The thickness of the layer 14 is chosen to equal one-quarter of the wavelength of the microwave radiation of concern in the material of layer 14, and is typically about 0.05 to 0.5 inch (0.13 to 1.3 cm). The layer 14 may be provided in the form of a free-standing body of material or it may be deposited on the layer 12. If provided as separate bodies of material, the layers 12 and 14 are held together by mounting fixtures or a thin layer of a suitable optical cement, such as an epoxy material.

In operation, the optical window 10 functions as follows. Incoming microwave radiation, indicated by ray A in FIG. 1, strikes the interface 16 of layer 14 with air. Due to the low reflectivity of layer 14 for microwave radiation, a small percentage of ray A is reflected from interface 16 as ray B. Some microwaves from ray A travel through layer 14 and are reflected at the interface 18 between the layers 12 and 14, as ray C. Since the thickness of layer 14 is one-quarter of the wavelength of the microwave radiation, ray C is reflected in such a manner that rays B and C destructively interfere and thus significantly reduce the reflection of microwaves. The portion of the microwaves from ray A which passes through the interface 18 is absorbed by the layer 12, and thus does not strike the optical system behind the optical window 10. Infrared radiation, indicated in FIG. 1 as ray D, is transmitted through layers 14 and 12, and is limited only by the natural attenuation of the materials of layers 14 and 12 for infrared radiation.

Thus, the optical window of the present invention combines three desirable window characteristics which have previously been mutually exclusive, namely, (a) low microwave reflectivity, (b) absorption of non-reflected microwaves, and (c) high optical transmission. Moreover, by appropriate selection of the thickness of the zinc sulfide layer or equivalent, the optical filter of the present invention can be tuned to a particular wavelength, as discussed in more detail below with reference to FIG. 2.

In accordance with an alternative embodiment of the present invention, there is provided at the interface 18 between layers 14 and 12 a thin film optical coating (not shown) which minimizes the reflection of infrared radiation from the interface 18. The coating may be applied to either layer 12 or layer 14. Suitable materials for this coating are materials which transmit infrared radiation and have a suitable refractive index, such as calcium fluoride, zinc sulfide or zinc selenide. Mixtures of suitable materials may also be used. The thickness of the coating is typically less than about 1.0 micrometer, and preferably about 0.5 micrometer for calcium fluoride. This coating will have negligible effect on the microwaves since it is thin compared to the wavelength of the microwaves.

In accordance with another alternative embodiment of the present invention, the layers 12 and 14 are selected to be materials which also transmit visible radiation in addition to infrared radiation. Suitable materials for this purpose are leaded glass or zinc sulfide for layer 12 and glass for layer 14.

Figure 2:
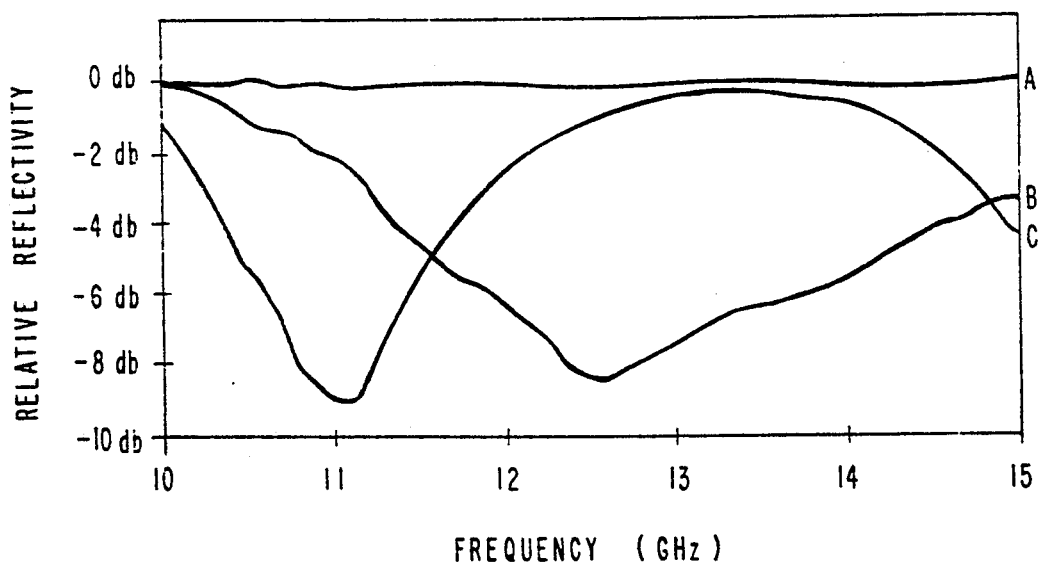
FIG. 2 presents curves showing the effectiveness of the optical window of the present invention to minimize the effects of microwave radiation.

FIG. 2 presents curves showing the relative reflectivity at various frequencies for two optical windows in accordance with the present invention, compared to a window of germanium. Tests were performed using standard procedures with the radiation at normal incidence, on an arch similar to the Naval Research Laboratory Arch. Curve A is the normalized reflection of a 3-inch (7.62 centimeter) diameter germanium window having a thickness of 0.25 inch (0.64 cm). Curve A was normalized to serve as a baseline to show the reductions in microwave reflectivity achieved using the optical windows of the present invention. Curve B shows the results obtained for an optical window of the present invention comprising a 0.25 inch (0.64 cm) thick layer of zinc sulfide and a 0.25 inch (0.64 cm) thick layer of germanium, both with a 3-inch (7.62 cm) diameter. As can be seen in Curve B of FIG. 2, there was a significant 8 decibel (db) reduction in microwave reflectivity compared to Curve A over a broad range, and centered at 12.5 gigahertz (GHz).

Curve C in FIG. 2 shows the results obtained for an optical window of the present invention comprising a 0.50 inch (1.27 cm) thick layer of zinc sulfide and a 0.25 inch (0.64 cm) thick layer of germanium, both with a 3-inch (7.62 cm) diameter. Curve C shows an 8 db reduction in microwave reflectivity compared to Curve A, with the center of the microwave absorption at 11 GHz. Thus, by comparing Curves B and C, it can be seen that the optical windows of the present invention can be tuned to a specific wavelength by appropriate selection of the thickness of the zinc sulfide layer or equivalent material.

Having thus described exemplary embodiments of the present invention, it should be noted by those skilled in the art that the disclosures within are exemplary only and that various other alternatives, adaptations, and modifications may be made within the scope of the present invention. Accordingly, the present invention is not limited to the specific embodiments as illustrated herein, but is only limited by the following claims.

What is claimed is:

1. An optical window that transmits infrared radiation and minimizes the effect of microwave radiation comprising:
   (a) a layer of a first material which transmits said infrared radiation and absorbs said microwave radiation, said layer of said first material having a predetermined thickness; and
   (b) a layer of a second material which transmits said infrared radiation and has a low reflectivity for said microwave radiation, said layer of said second material having a thickness equal to one-quarter of the wavelength of said microwave radiation in said second material, and said layer of said second material being located adjacent to said layer of said first material.

2. The optical window as set forth in claim 1 wherein:
   (a) said first material is selected from the group consisting of germanium, silicon, and gallium arsenide; and
   (b) said second material is selected from the group consisting of zinc sulfide, zinc selenide, and calcium fluoride.

3. The optical window as set forth in claim 2 wherein:
   (a) said first material comprises germanium and has a thickness within the range of about 0.1 to 1.0 inch (0.3 to 2.5 cm); and
   (b) said second material comprises zinc sulfide and has a thickness within the range of about 0.05 to 0.5 inch (0.13 to 1.3 cm).

4. The optical window as set forth in claim 1 wherein:

(a) said layer of said first material has a thickness within the range of about 0.1 to 2.0 inch (0.3 to 5.1 cm); and
(b) said layer of said second material has a thickness within the range of about 0.05 to 0.5 inch (0.13 to 1.3 cm).

5. The optical window as set forth in claim 1 further comprising a thin layer of a third material located at the interface of said layer of said first material and said layer of said second material, that minimizes the reflection of said infrared radiation at said interface.

6. The optical window as set forth in claim 5 wherein said third material is selected from the group consisting of calcium fluoride, zinc sulfide, and zinc selenide and has a thickness of less than about 1.0 micrometer.

7. The optical window as set forth in claim 1 wherein said first and second materials transmit both visible radiation and infrared radiation.

8. The optical window as set forth in claim 7 wherein said first material is selected from the group consisting of leaded glass and zinc selenide, and said second material comprises glass.

9. A method for transmitting infrared radiation while minimizing the effects of microwave radiation comprising providing an optical window comprising:
(a) a layer of a first material which transmits said infrared radiation and absorbs said microwave radiation, said layer of said first material having a predetermined thickness; and
(b) a layer of a second material which transmits said infrared radiation and has a low reflectivity for said microwave radiation, said layer of said second material having a thickness equal to one-quarter of the wavelength of said microwave radiation in said second material, and said layer of said second material being located adjacent to said layer of said first material.

10. A method as set forth in claim 9 wherein said optical window further comprises a thin layer of a third material located at the interface of said layer of said first material and said layer of said second material, that minimizes the reflection of said infrared radiation at said interface.

* * * * *